United States Patent [19]

Takata

[11] Patent Number: 4,589,046
[45] Date of Patent: May 13, 1986

[54] APPARATUS FOR DETECTING GROUND FAULT IN VARIABLE-VOLTAGE VARIABLE-FREQUENCY POWER SYSTEM

[75] Inventor: Nobuharu Takata, Hyogo, Japan

[73] Assignee: Mitsubishi Denki Kabushiki Kaisha, Tokyo, Japan

[21] Appl. No.: 592,440

[22] Filed: Mar. 22, 1984

[30] Foreign Application Priority Data

Mar. 23, 1983 [JP] Japan .................................. 58-49740
Mar. 23, 1983 [JP] Japan .................................. 58-49742

[51] Int. Cl.$^4$ ............................................. H02H 3/16
[52] U.S. Cl. ......................................... 361/42; 361/47
[58] Field of Search .................................. 361/40–42, 361/44–50

[56] References Cited

U.S. PATENT DOCUMENTS

| | | | |
|---|---|---|---|
| 2,177,900 | 10/1939 | Logan | 361/42 |
| 3,728,618 | 4/1973 | Nimes | 361/47 |
| 4,258,403 | 3/1981 | Shimp | 361/42 |

FOREIGN PATENT DOCUMENTS 2110016  6/1982  United Kingdom .................. 361/45

*Primary Examiner*—J. R. Scott
*Attorney, Agent, or Firm*—Bernard, Rothwell & Brown

[57] ABSTRACT

An apparatus for detecting a ground fault in a power system which supplies an electric power whose frequency is varied while being kept at a predetermined ratio to the voltage thereof. In this apparatus, a zero phase sequence current (voltage) from such power system is introduced to a plurality of current (voltage) detectors having respective threshold values for current (voltage) level detection, while a voltage related to the frequency of the electric power is introduced to a plurality of frequency detectors having respective threshold values for frequency detection, and the output signals of the current (voltage) and frequency detectors are discriminated in accordance with predetermined logical condition, to produce a signal representative of a ground fault.

6 Claims, 6 Drawing Figures

APPARATUS FOR DETECTING GROUND FAULT IN VARIABLE-VOLTAGE VARIABLE-FREQUENCY POWER SYSTEM

FIELD OF THE INVENTION

The present invention relates to an apparatus designed for detection of a ground fault occurring on a power feed line in an electric power system and, more particularly, to an apparatus for detecting a ground fault in a variable-voltage and variable-frequency power system.

It is generally known that the rotational speed of a motor is controllable by varying the frequency of an electric power being fed thereto while maintaining the frequency-to-voltage ratio at a predetermined value. And in such a power system, any ground fault occurring on the power feed line thereof needs to be detected properly regardless of the frequency and the voltage change of the power.

FIG. 1 is a connection diagram of a conventional detecting apparatus, wherein the electric power from an AC power supply line 1 is normally maintained at a fixed voltage and frequency and is fed to a variable-voltage variable-frequency (VVVF) power unit 2 so as to be converted into a variable-voltage and variable-frequency power. The power thus obtained is fed via a voltage transformer 3 to a load such as an AC motor 4. The delta-connection primary winding of the voltage transformer 3 is connected to the power unit 2, while the Y-connection secondary winding thereof is connected to the load with its neutral point being grounded via a resistor 5. For detection of a zero phase sequence current flowing through the resistor 5, a current transformer 6 is provided on a line connecting the resistor 5 with the ground, and the output of the current transformer 6 is introduced to a ground fault detecting apparatus 7 having a predetermined threshold value for detecting a ground fault.

The motor 4 rotates at a speed corresponding to the frequency f of the input power from the power unit 2. In order to prevent overheating of the motor that may be induced by overexcitation during a low-frequency operation, the VVVF power unit 2 is so controlled as to maintain the following relationship with respect to its output voltage E and the frequency f.

$$E/f = V_s \text{ (constant)} \qquad (1)$$

Supposing now that a one-phase ground fault has occurred at a point F on the line connecting between the voltage transformer 3 and the motor 4, a signal corresponding to the zero phase sequence current $3I_o$ increased via the resistor 5 and the current transformer 6 is inputted to a detector 7. The zero phase sequence current is represented by the following equation:

$$3 I_o = E/R_n = V_s \cdot f/R_n \qquad (2)$$

where $R_n$ is a constant proportional to the value of the resistor 5.

Since the current $3I_o$ in this case exceeds the threshold value, the detector 7 operates to indicate an occurrence of a one-phase ground fault.

As is obvious from Eq. (2), the current $3I_o$ is related with the frequency f. Therefore, if a one-phase ground fault occurs during a time when the frequency f is lowered, the detector 7 fails to respond properly to the input as its level is also correspondingly lowered with the frequency. Such a phenomenon is caused due to the fact that the typical threshold value for the detector 7 is selected at 20 to 50% of the current $3I_o$ which is equal to that of a one-phase complete ground fault at a commercial frequency. For example, if the threshold value for the detector 7 is so selected as to be capable of detecting a 40% incomplete ground fault at the normal operating frequency fs of the line 1, a complete ground fault during which the present frequency f is as low as fs×30% allows to input to the detector 7 of merely $3I_o \times 30\% \times f_s$ and consequently it fails to respond properly to such a low input level.

SUMMARY OF THE INVENTION

It is a primary object of this invention to provide an improved apparatus for detecting any ground fault with a proper response even when the frequency of an electric power being fed to a load is different from a normal frequency.

It is another object of this invention to provide an improved apparatus for detecting correctly any ground fault occurring in an electric power system whose voltage and frequency are variable.

With a ground fault detecting apparatus according to the present invention, a zero phase sequence current in a power system, where an electric power to be fed to a load has a variable frequency and a variable voltage, is introduced to a plurality of current detecting means having respective threshold values for current level detection, while a voltage related to the frequency supplied with the electric power from the power system is introduced to a plurality of frequency detecting means having respective threshold values for frequency detection. Output signals of said current and frequency detecting means are introduced to logical means for providing a predetermined logical decision to generate a signal representing the detected ground fault.

The zero phase sequence current introduced to the current detecting means may be that flowing to the neutral point in the Y-connection winding of the voltage transformer connected to the load. Instead of employing the zero phase sequence current detecting means with a Y-connection winding other zero phase sequence voltage detecting means may be employed, such as that obtained by the one-side open delta-connection winding of the voltage transformer connected to the load.

The voltage related to the frequency and introduced to the frequency detecting means may be the output of a pilot generator which is co-axially connected with the rotating load. The voltage related to the frequency and introduced to the frequency detecting means may be the interphase voltage of the power line connected to the input terminal of the load.

And the logical means may be so arranged as to provide a ground fault signal by obtaining a logical product between the current signal of each current detecting means and the frequency signal of each frequency detecting means associated individually with each current signal.

DESCRIPTION OF THE PREFERRED EMBODIMENTS

Hereinafter the exemplary embodiments of the present invention will be described with reference to the accompanying drawings.

Figure 1:
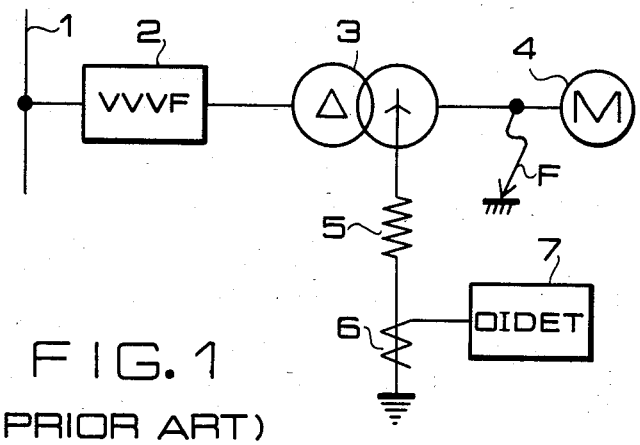
FIG. 1 is an input connection diagram of a conventional ground fault detecting apparatus.
Figure 2:
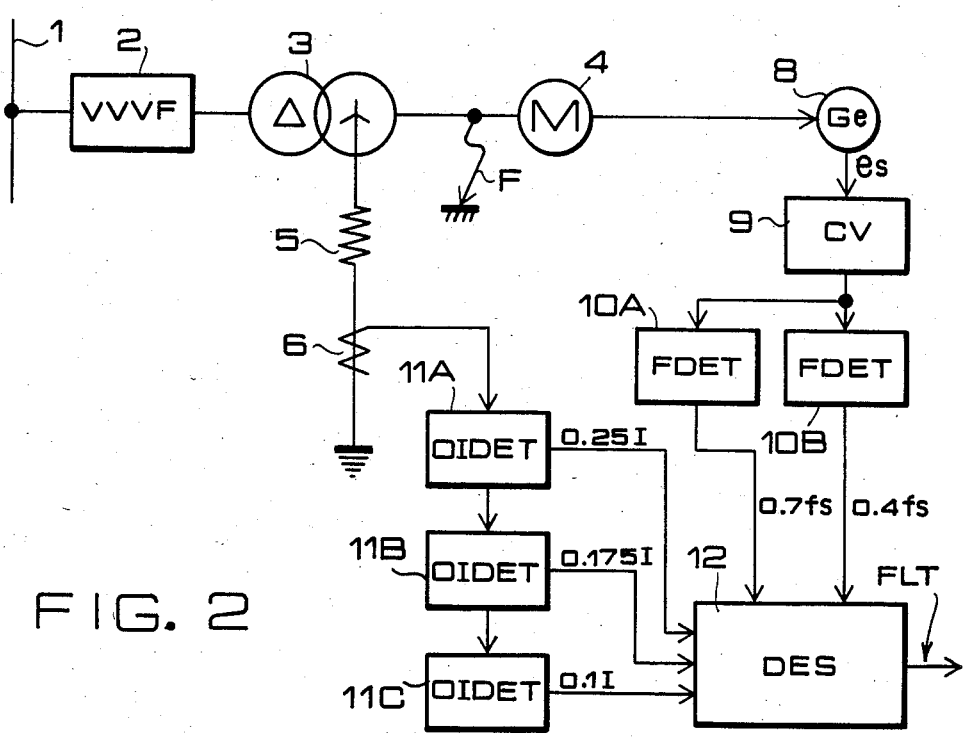
FIG. 2 is a block diagram of a first embodiment of the present invention.

In FIG. 2, a pilot generator (Ge) 8 is connected to a motor 4. The output voltage $e_s$ of the pilot generator is introduced via a converter (CV) 9 to comparators (FDET) 10A and 10B each having a frequency detecting function. The converter 9 serves to convert the input to a signal level suited for processing the same. The detector 10A produces a signal 0.7fs of a level "1" when the frequency of the converter output signal is lower than 70% of the frequency fs; while the detector 10B produces a signal 0.4fs of a level "1" when the frequency of the converter output signal is lower than 40% of the frequency fs. The output current of the current transformer 6 is introduced to overcurrent detectors 11A, 11B and 11C, which are respectively set to produce an output signal of a level "1" when driven by input currents respectively exceeding 25%, 17.5% and 10% of the reference current 3Io which is equal to that of a complete ground fault at a frequency fs. A ground fault discriminator (DES) 12 receives respective output signals 0.7fs, 0.4fs, 0.25I, 0.175I and 0.1I from the detectors 10A, 10B and 11A–11C.

Figure 3:
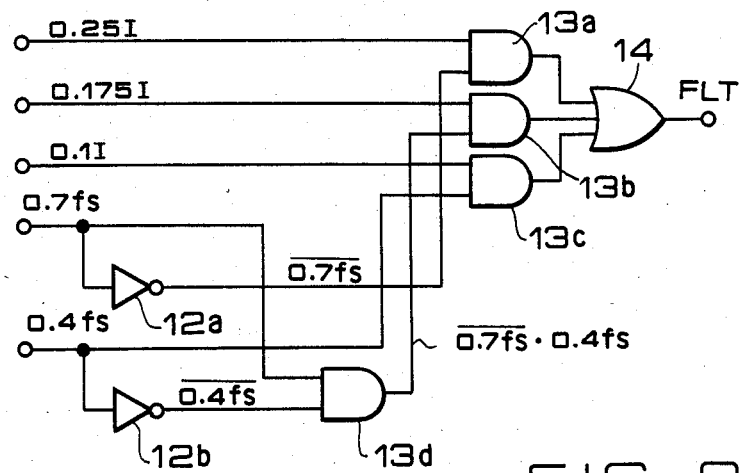
FIG. 3 shows connection of logical circuits in a discriminator of FIG. 2.

Referring now to FIG. 3 wherein logical circuits of the discriminator 12 are shown, an AND gate 13a receives both the output signal 0.25I from the detector 11A and a signal 0.7fs obtained by inverting the output signal 0.7fs from the detector 10A through an inverter 12a. An AND gate 13b receives both the output signal 0.175I from the detector 11A and the output signal 0.7fs × 0.4fs from an AND gate 13d. The AND gate 13d receives both the output signal 0.7fs from the frequency detector 10A and a signal 0.4fs obtained by inverting the output signal 0.4fs from the detector 10B through an inverter 12B. An AND gate 13c receives both the output signal 0.1I from the detector 11C and the output signal 0.4fs from the detector 10B.

In such circuit arrangement, if the following condition is satisfied upon occurrence of a ground fault F in the power system as shown in FIG. 2, an OR gate 14 turns a ground fault signal FLT to a high level.

(1) When f≧fs×70%: As the signal 0.7fs from the detector 10A is at a low level, the AND gate 13a is gated if the signal 0.25I from the detector 11A is turned to a high level.

(2) When 40%×fs ≦f<70%×fs: The signal 0.7fs from the detector 10A is at a high level while the signal 0.4fs of the detector 10B is at a low level, so that the AND gate 13d is gated. At this moment, if the signal 0.175I from the detector 11A is turned to a high level, the AND gate 13b is also gated.

(3) When f<fs×40%: If the signal 0.4fs from the detector 10B is at a high level and the signal 0.1I from the detector 11C is turned to a high level, the AND gate 13c is gated.

A signal FLT from the OR gate 14 indicates occurrence of the ground fault F.

The detection range of the system is thus extended to an incomplete ground fault of 17.5%/50%=35% during an operation at a frequency of 50%×fs. And during an operation at a frequency of 30%×fs, the detection range is also extended to an incomplete ground fault of 10%/30%=33.3%.

Although two frequency detectors and three overcurrent detectors are employed in the example mentioned above, it is also possible to arrange N (greater than one) frequency detectors and N+1 overcurrent detectors in such a manner that the over-current detectors correspond respectively to the individual N+1 frequency divided detection area.

Figure 4:
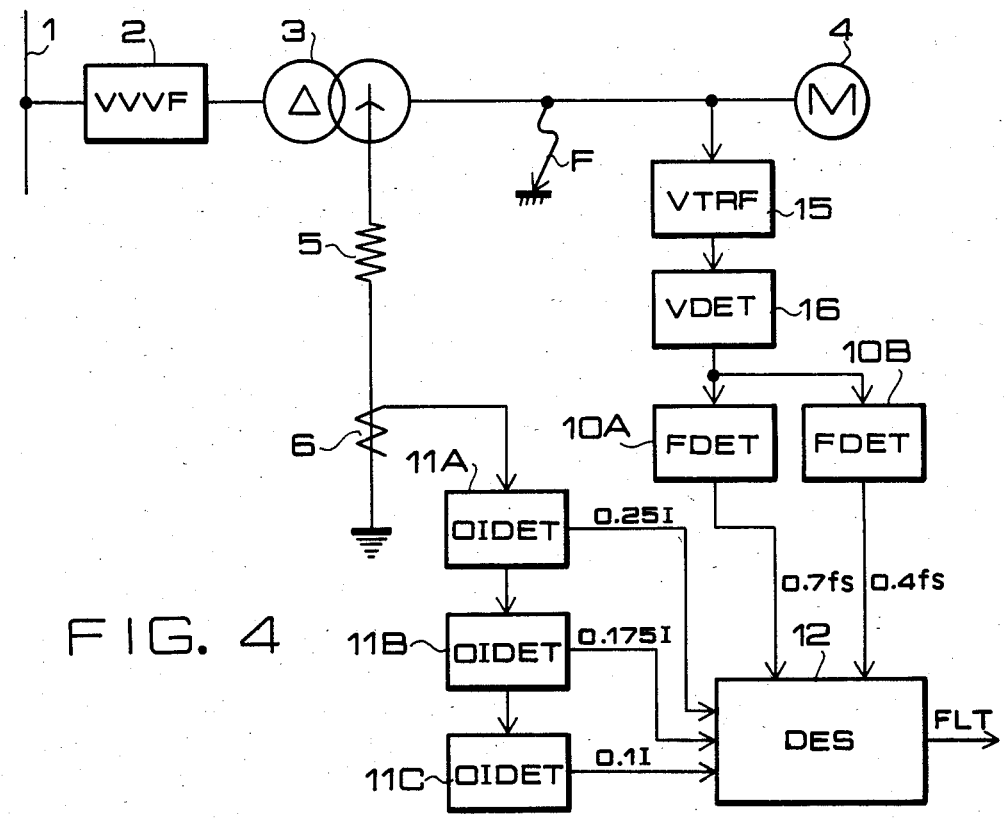
FIG. 4 is a block diagram of a second embodiment of the invention.

In the foregoing first embodiment, the frequency f in the power system is detected by utilizing the output voltage of the generator 8. However, in case a non-grounded neutral-point or through-resistance grounded connection is adopted, the interphase voltage in the system is proportional to the frequency f and is hardly fluctuated upon occurrence of a one-phase ground fault. Therefore, as shown in a second embodiment of FIG. 4, the interphase voltage in the system may be introduced via a voltage transformer (VTRF) 15 to a voltage detector (VDET) 16, and its output may then be introduced to detectors 10A and 10B either directly or after suitable conversion into a signal level for frequency detection.

In addition to the aforesaid example where the zero phase sequence current is extracted from the grounding circuit of the voltage transformer 3, the zero phase sequence current may be obtained by any other means such as the sum of the individual phase sequence currents (residual currents). Instead of the zero phase sequence current the zero phase sequence voltage may be so used that as an example shown in a third embodiment of FIG. 5, a required zero phase sequence voltage corresponding to the zero phase sequence current at the occurrence of a one-phase ground fault is extracted from the one-side open delta-connection winding of the voltage transformer 3 and then is introduced to the detectors 11A–11C.

Figure 5:
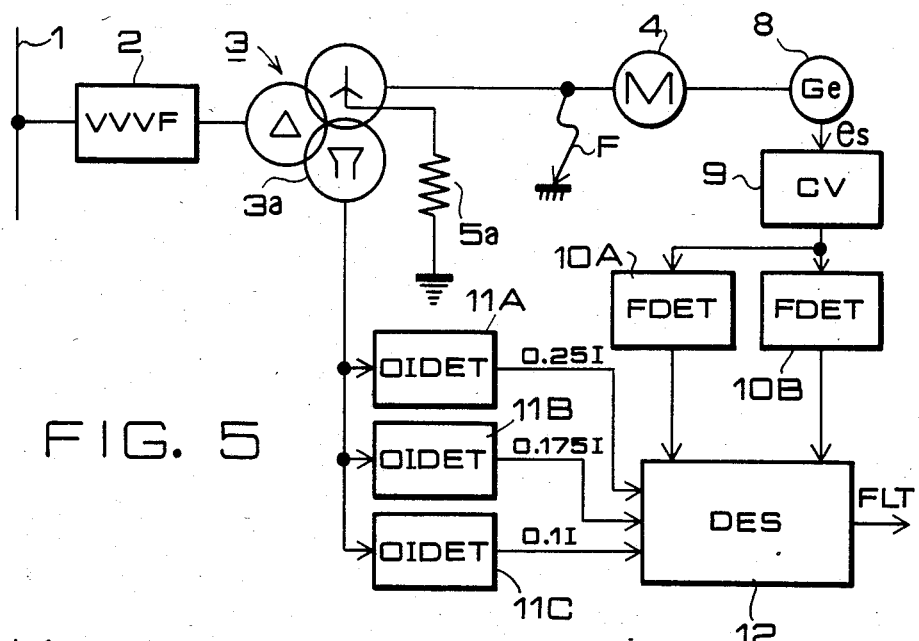
FIG. 5 is a block diagram of a third embodiment of the invention.
Figure 6:
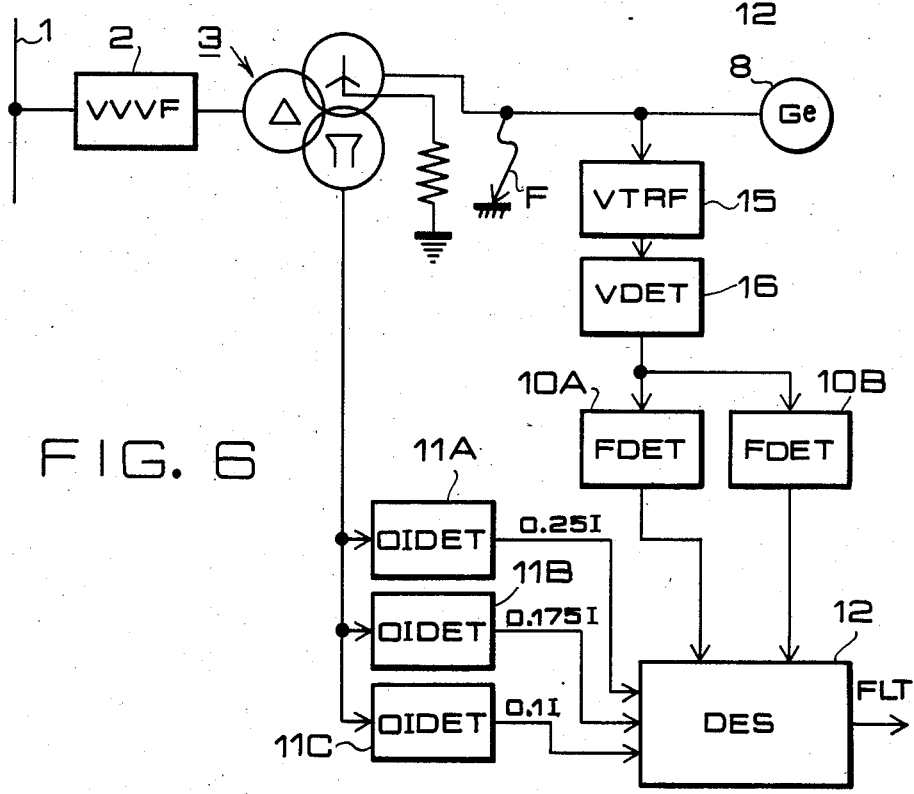
FIG. 6 is a block diagram of a fourth embodiment of the invention.

Furthermore, as shown in a fourth embodiment of FIG. 6, the converter 9 in FIG. 5 may be replaced with a transformer 15 and a detector 16.

According to the present invention, even when the load in the power system is not an AC motor, similar advantage is achievable if the system operates such that the voltage-to-frequency ratio therein is maintained at a fixed value.

What is claimed is:

1. An apparatus for detecting a ground fault in a power system which supplies an electric power to a load while maintaining the frequency-to-voltage ratio of said electric power at a predetermined value, said apparatus comprising: a plurality of current detecting means having respective threshold values for current detection and receiving a zero phase sequence current of said power system introduced thereto;

a plurality of frequency detecting means having respective threshold values for frequency detection and receiving a voltage related to the frequency of the electric power to be supplied to said load; and logical means for discriminating the states of the output signals from said current and frequency detecting means in accordance with predetermined logical conditions and, when said conditions are satisfied, producing a signal representative of occurrence of a ground fault in said power system.

2. The apparatus as defined in claim 1, wherein the input introduced to said current detecting means is a zero phase sequence current flowing through a neutral point in the Y-connection winding of a voltage transformer connected to said load.

3. The apparatus as defined in claim 2, wherein the input introduced to said current detecting means is a zero phase sequence voltage obtained by a voltage transformer connected to said load.

4. The apparatus as defined in claim 1, 2 or 3, wherein the load is a rotational load and wherein the input introduced to said frequency detecting means is the output voltage of a pilot generator being co-axially connected with said rotational load.

5. The apparatus as defined in claim 1, 2 or 3, wherein the input introduced to said frequency detecting means is the interphase voltage of a power line connected to the input terminal of said load.

6. The apparatus as defined in claim 1, 2 or 3, wherein said logical means provides a ground fault signal generated by a logical product between the current detection signal from each current detecting means and the frequency detection signal from each frequency detecting means associated logically and individually with said current detection signal.

* * * * *